(12) United States Patent
Liu et al.

(10) Patent No.: US 8,639,042 B2
(45) Date of Patent: Jan. 28, 2014

(54) HIERARCHICAL FILTERED MOTION FIELD FOR ACTION RECOGNITION

(75) Inventors: Zicheng Liu, Bellevue, WA (US); Yingli Tian, Yorktown Heights, NY (US); Liangliang Cao, Urbana, IL (US); Zhengyou Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 311 days.

(21) Appl. No.: 12/820,143

(22) Filed: Jun. 22, 2010

(65) Prior Publication Data

US 2011/0311137 A1      Dec. 22, 2011

(51) Int. Cl.
*G06K 9/62*      (2006.01)

(52) U.S. Cl.
USPC ............ 382/224; 382/273; 382/162; 382/168; 382/254; 382/264; 375/240.1; 375/240.62; 375/240.16; 348/451; 348/452; 348/443; 348/441; 348/449

(58) Field of Classification Search
CPC ................. G06K 9/00664; G06K 9/00711
USPC ......... 382/224, 173, 162, 168, 254, 264, 273; 348/451, 452, 443, 449, 441; 375/240.16, 240.27, 240.1, 240.62
See application file for complete search history.

(56) References Cited

U.S. PATENT DOCUMENTS

| | | | |
|---|---|---|---|
| 6,597,738 B1 * | 7/2003 | Park et al. | 375/240.16 |
| 6,677,969 B1 | 1/2004 | Hongo | |
| 7,227,893 B1 * | 6/2007 | Srinivasa et al. | 375/240.08 |
| 7,447,334 B1 | 11/2008 | Jiang et al. | |
| 7,656,952 B2 * | 2/2010 | Zhou et al. | 375/240.12 |
| 2001/0043722 A1 * | 11/2001 | Wildes et al. | 382/107 |
| 2005/0084141 A1 | 4/2005 | Kato et al. | |
| 2005/0157908 A1 | 7/2005 | Matsugu et al. | |
| 2006/0280249 A1 * | 12/2006 | Poon | 375/240.16 |
| 2008/0232687 A1 * | 9/2008 | Petersohn | 382/173 |
| 2008/0285807 A1 | 11/2008 | Lee et al. | |
| 2008/0310734 A1 | 12/2008 | Ahammad et al. | |
| 2009/0245694 A1 * | 10/2009 | Sartor et al. | 382/300 |
| 2009/0257670 A1 * | 10/2009 | Chiu et al. | 382/239 |
| 2010/0034462 A1 | 2/2010 | Nevatia et al. | |

OTHER PUBLICATIONS

Barnum, et al., "Creating a Computer Cop", Retrieved at << http://www.cs.rochester.edu/~brown/242/assts/termprojs/food.pdf >>, May 2003, pp. 1-16.

(Continued)

*Primary Examiner* — Mike Rahmjoo
(74) *Attorney, Agent, or Firm* — Gonzalez Saggio & Harlan LLP

(57) ABSTRACT

Described is a hierarchical filtered motion field technology such as for use in recognizing actions in videos with crowded backgrounds. Interest points are detected, e.g., as 2D Harris corners with recent motion, e.g. locations with high intensities in a motion history image (MHI). A global spatial motion smoothing filter is applied to the gradients of MHI to eliminate low intensity corners that are likely isolated, unreliable or noisy motions. At each remaining interest point, a local motion field filter is applied to the smoothed gradients by computing a structure proximity between sets of pixels in the local region and the interest point. The motion at a pixel/pixel set is enhanced or weakened based on its structure proximity with the interest point (nearer pixels are enhanced).

11 Claims, 4 Drawing Sheets

(56) References Cited

OTHER PUBLICATIONS

Aggarwal, et al., "Human Motion Analysis: A Review", Retrieved at << http://citeseerx.ist.psu.edu/viewdoc/download?doi=10.1.1.50.6195&rep=rep1&type=pdf >>, 1999, pp. 13.
Fihl, et al., "Action Recognition using Motion Primitives and Probabilistic Edit Distance", Retrieved at << http://www.google.co.in/url?sa=t&source=web&ct=res&cd=8&ved=0CDAQFjAH&url=http%3A%2F%2Fciteseerx.ist.psu.edu%2Fviewdoc%2Fdownload%3Fdoi%3D10.1.1.67.9240%26rep%3Drep1%26type%3Dpdf&rct=j&q=%22Action+recognition%22+motion+history+image&ei=ERHES-aKMaT40wTfhbjLDg&usg=AFQjCNE7fuVPYKdEeONCOWyATakpihHmcw >>, Retrieved Date: Apr. 13, 2010, pp. 1-10.
"Action Recognition", Retrieved at << http://mha.cs.umn.edu/proj_recognition.html >>, Retrieved Date: Apr. 13, 2010, pp. 5.
Bobick, et al., "The Recognition of Human Movement Using Temporal Templates", Retrieved at << http://ieeexplore.ieee.org/stamp/stamp.jsp?arnumber=00910878 >>, IEEE Transactions on Pattern Analysis and Machine Intelligence, vol. 23, No. 3, Mar. 2001, pp. 11.
Davis, James W., "Hierarchical Motion History Images for Recognizing Human Motion", Retrieved at << http://ieeexplore.ieee.org/stamp/stamp.jsp?tp=&arnumber=938864&userType=inst >>, IEEE, 2001, pp. 39-46.
Lowe, David G., "Distinctive Image Features from Scale-Invariant Keypoints", Retrieved at << http://www.cs.ubc.ca/~lowe/papers/ijcv04.pdf >>, International Journal of Computer Vision, Jan. 5, 2004, pp. 1-28.
Mattivi, et al., "Human Action Recognition Using LBP-TOP as Sparse Spatio-Temporal Feature Descriptor", Retrieved at << http://www.springerlink.com/content/b2w34k5215156653/fulltext.pdf >>, 2009, pp. 740-747.
Mikolajczyk, et al., "Action Recognition with Motion-appearance Vocabulary Forest", Retrieved at << http://ieeexplore.ieee.org/stamp/stamp.jsp?arnumber=04587628 >>, IEEE, 2008, pp. 8.
Nicolescu, et al.,"A Voting-based Computational Framework for Visual Motion Analysis and Interpretation", Retrieved at << http://ieeexplore.ieee.org/stamp/stamp.jsp?tp=&arnumber=1407877 >>, IEEE Transactions on Pattern Analysis and Machine Intelligence, vol. 27, No. 5, May 2005, pp. 739-752.
Oikonomopoulos, et al., "Spatiotemporal Salient Points for Visual Recognition of Human Actions", Retrieved at << http://citeseerx.ist.psu.edu/viewdoc/download?doi=10.1.1.104.6056&rep=rep1&type=pdf >>, Oct. 11, 2005, pp. 21.
Reynolds, et al., "Speaker Verification Using Adapted Gaussian Mixture Models", Retrieved at << http://www.cse.ohio-state.edu/~dwang/teaching/cse788/papers/Reynolds-dsp00.pdf >>, Digital Signal Processing vol. 10, Nos. 1-3, Jan./Apr./Jul. 2000, pp. 19-41.
Weinland, et al., "Free Viewpoint Action Recognition Using Motion History Volumes", Retieved at << http://perception.inrialpes.fr/Publications/2006/WRB06a/cviu_motion_history_volumes.pdf>>, Oct. 16, 2006, pp. 20.
Yan, et al., "Regression from Patch-kernel", Retrieved at << http://mplab.ucsd.edu/wordpress/wp-content/uploads/CVPR2008/Conference/data/papers/065.pdf >>, IEEE, 2008, pp. 8.
Dalal, et al., "Histograms of Oriented Gradients for Human Detection", Retrieved at << http://lear.inrialpes.fr/people/triggs/pubs/Dalal-cvpr05.pdf >>, Retrieved Date: Apr. 13, 2010, pp. 8.
Dollar, et al., "Behavior Recognition via Sparse Spatio-Temporal Features", Retrieved at << http://citeseerx.ist.psu.eduNiewdoc/download?doi=10.1.1.77.5712&rep=rep1Mype=pdf >>, Retrieved Date: Apr. 13, 2010, pp. 1-8.
Fathi, et al., "Action Recognition by Learning Midlevel Motion Features", Retrieved at << http://www.cs.sfu.ca/~mori/ research/papers/fathi_actionrecognition_cvpr08.pdf >>, Retrieved Date: Apr. 13, 2010, pp. 1-8.
Gilbert, et al., "Scale Invariant Action Recognition Using Compound Features Mined from Dense Spatio-Temporal Corners", Retrieved at << http://info.ee.surrey.ac.uk/Personal/R.Bowden/publications/eccv08/Final%2520Version° 2520ECCV08.pdf >>, Retrieved Date: Apr. 13, 2010, pp. 12.
Harris, et al., "A Combined Corner and Edge Detector.", Retrieved at << http://www.bmva.org/bmvc/1988/ avc-88-023.pdf >>, Retrieved Date: Apr. 13, 2010, pp. 147-152.
Jhuang, et al., "A Biologically Inspired System for Action Recognition", Retrieved at << http://web.mit.edu/serre/www/publications/Jhuang_etal_iccv07.pdf >>, Retrieved Date: Apr. 13, 2010, pp. 8.
Ke, et al., "Event Detection in Crowded Videos", Retrieved at << http://www.cs.cmu.edu/-yke/video/iccv2007.pdf >>, Retrieved Date: Apr. 13, 2010, pp. 8.
Laptev, et al., "Space-time Interest Points", Retrieved at << http://citeseerx.ist.psu.edu/viewdoc/download;jsessionid=B8338C956B8F2D4A93803EBE99A74136?doi=10.1.1.4.4359&rep=rep1&type=pdf >>, Retrieved Date: Apr. 13, 2010, pp. 8.
Laptev, et al., "Learning Realistic Human Actions from Movies", Retrieved at << http://www.cs.ucf.edu/courses/cap6412/fa112008/papers/2008_cvpr_laptev.pdf >>, Retrieved Date: Apr. 13, 2010, pp. 8.
Liu, et al., "Learning Human Actions via Information Maximization", Retrieved at << http://citeseerx.ist.psu.edu/viewdoc/download?doi=10.1.1.153.317&rep=rep1&type=pdf >>, Retrieved Date: Apr. 13, 2010, pp. 8.
Marszalek, et al., "Actions in Context", Retrieved at << http://lear.inrialpes.fr/pubs/2009/MLS09/MarszalekLaptevSchmid-CVPRO9-ActionsContext.pdf >>, Retrieved Date: Apr. 13, 2010, pp. 1-8.
Messing, et al., "Activity Recognition Using the Velocity Histories of Tracked Keypoints, ICCV, 2009.", Retrieved at << http://www.cs.rochester.edu/~rmessing/messingICCV2009CameraReady.pdf >>, Retrieved Date: Apr. 13, 2010, pp. 1-8.
Niebles, et al., "Unsupervised Learning of Human Action Categories Using Spatial-temporal Words", Retrieved at << http://citeseerx.ist.psu.edu/viewdoc/download?doi=10.1.1.83.8353&rep=rep1&type=pdf >>, Retrieved Date: Apr. 13, 2010, pp. 10.
Schuldt, et al., "Recognizing Human Actions: A Local SVM Approach", Retrieved at << ftp://ftp.nada.kth.se/CVAP/users/laptev/icpr04actions.pdf >>, Retrieved Date: Apr. 13, 2010, pp. 5.
Sun, et al., "Hierarchical Spatio-Temporal Context Modeling for Action Recognition", Retrieved at << http://lms.comp.nus.edu.sg/papers/video/2009/cvpr09—wuxiao.pdf >>, Retrieved Date: Apr. 13, 2010, pp. 1-8.
Wang, et al., "Evaluation of Local Spatio-temporal Features for Action Recognition", Retrieved at << http://class.inrialpes.fr/pub/wang—bmvc09.pdf >>, Retrieved Date: Apr. 13, 2010, pp. 11.
Yuan, et al., "Discriminative Subvolume Search for Efficient Action Detection", Retrieved at << http://www.eecs.northwestern.edu/~jyu410/index_files/papers/Yuan_Liu_Wu_CVPRO9.pdf >>, Retrieved Date: Apr. 13, 2010, pp. 1-8.

* cited by examiner

HIERARCHICAL FILTERED MOTION FIELD FOR ACTION RECOGNITION

BACKGROUND

Automated recognition of human actions in video clips has many useful applications, including surveillance, health care, human computer interaction, computer games, and telepresence. In general, a trained action model (classifier) processes the video clips to determine whether a particular action takes place.

One typical situation is that action models are trained on video data with a clean background, such as by a single person performing the action of interest with little or no movement in the background. Once trained and used for classifying actual video, accurate action recognition is difficult when the video clip being processed has a cluttered and moving background, that is, when the motion field in an action region is contaminated by background motions. This is common in actual video clips, and thus it is desirable to more accurately recognize human actions in dynamic and/or crowded environments, while still being able to use action models trained on video data with a clean background.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which video data containing motion information is filtered into interest points from which associated motion features are determined. The interest points may be represented as feature descriptors that contain spatial information for the spatial characteristics of a region corresponding to the interest point and temporal information for the motion data of the region.

In one aspect, possible points of interest corresponding to action data and background data within video data are obtained, e.g., corners obtained by a Harris corner component. These possible points of interest are associated with motion information, such as by a motion history image that represents more recent motion by more intensity in the image. Gradients of the motion history image may be obtained, and smoothing performed to remove points that are likely static background points by a global filter that filters out low-intensity points (relative to a threshold).

In one aspect, the remaining set of interest points are further processed by a local motion filter. In general, sets of pixels in a region (neighborhood) corresponding to an interest point have associated motion data varied based upon each set's proximity to the interest point, such as measured by distance from the closest pixel in the set to the interest point. Those sets of pixels that are close to the interest point have their motion data enhanced, while those sets of pixel that are far from the interest point have their motion data reduced.

In one aspect, feature descriptors are generated for the regions. The feature descriptors include spatial (e.g., appearance) information, such as in a Histogram of Oriented Gradient (HOG) component comprising normalized histograms of patches corresponding to the region. The feature descriptors also may include a HOG-MHI that represents the motion features in a motion history image (MHI).

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards obtaining stable and generalized features from video, including by using feature descriptors that are able to characterize actions but are more insensitive to cluttered background motion. To this end, there is provided an efficient hierarchical filtering technique to extract motion information and reduce the motions caused by moving background objects.

In one aspect, interest points and a Motion History Image (MHI) that provides representations of motion are extracted from video. A global spatial motion smoothing filter is applied to the gradients of the (MHI). At each interest point, a local motion field filter is applied to the smoothed gradients of MHI by computing a structure proximity between a pixel in a local region and the interest point. The motion at a pixel is varied (enhanced or weakened) based on its structure proximity with the interest point.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and video processing in general.

Figure 1:
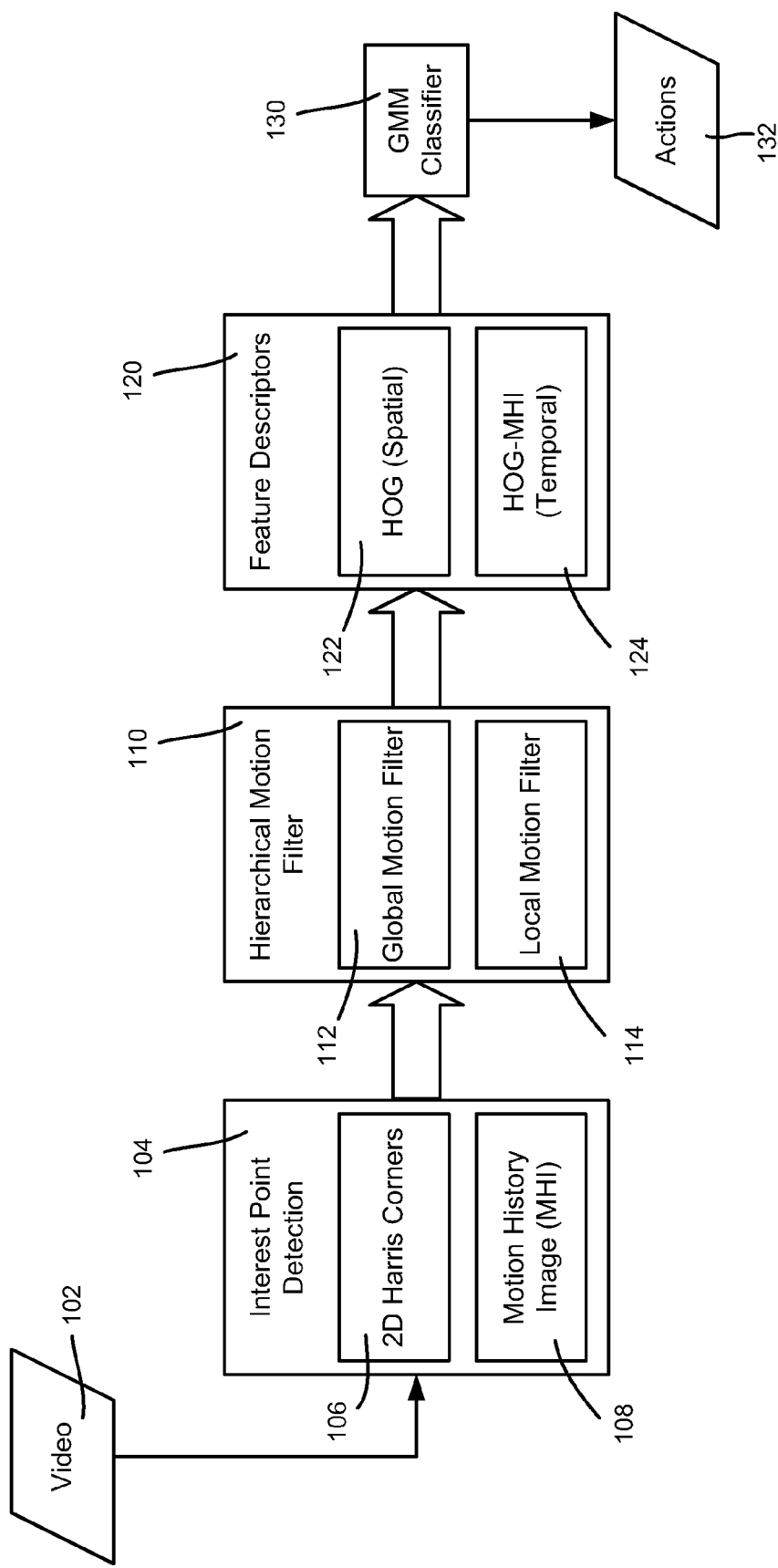
FIG. 1 is a representation of a framework for filtering detected interest points in a video clip for generating feature descriptors including motion information.

FIG. 1 is a block diagram showing a framework for action recognition that provides benefits in videos with crowded, dynamic backgrounds. As will be understood, instead of using spatio-temporal invariant points, spatial and temporal information is separately extracted from the video by an interest point detection component 104 of the framework.

In one implementation, the spatial information is extracted as 2D Harris corners (block 106 in FIG. 1) in an original image. The temporal information is obtained from Motion History Image (MHI, a known mechanism represented by block 108), which is based on frame differencing over a plurality of frames (and allows avoiding unreliable keypoint tracking in crowded videos). The pixels in the MHI have intensities that indicate movement, with brighter intensities representing the moving objects with more recent motion. These pixels are formed as a motion template. As described below, the motion template and the extracted 2D Harris corners are combined for interest point detection, and only those corners with the most recent motion are selected as interest points.

More particularly, MHI comprises a real-time motion template that temporally layers consecutive image differences into a static image template. Pixel intensity is a function of the motion history at that location, where brighter values correspond to more recent motion. The directional motion information may be measured directly from the intensity gradients in the MHI, which are more efficient to compute than optical flow, and are also more robust because the motion information in MHI is mainly along the contours of the moving objects. Thus, unwanted motion in the interior regions of object contours is ignored.

To generate a MHI, a known replacement and decay operator is used. At location (x,y) and time t, the intensity of $MHI_\tau(x,y,t)$ is calculated:

$$MHI_\tau(x, y, t) = \begin{cases} \tau, & \text{if } D(x, y, t) = 1 \\ \max(0, MHI_\tau(x, y, t) - 1), & \text{otherwise} \end{cases} \quad (1)$$

where $D(x,y,t)$ is a binary image of differences between frames and $\tau$ is the maximum duration of motion, which is set to twenty (20) in one implementation. In one implementation, the MHI image is then scaled to a grayscale image with maximum intensity 255 for pixels with the most recent motion.

Interest point detection is based on detecting corners in images (2D Harris Corner Detection, which is well known) and combining the corners with the temporal information that is obtained from MHI. Note that Harris Corner detection is stable to different scales and insensitive to lighting changes. MHI is used as a motion mask to remove those corners that are in the static background, such that only the corners with more recent motion (the intensity in MHI is greater than a threshold value) are selected as interest points.

Returning to FIG. 1, another component of the framework comprises a hierarchical motion filter component 110. More particularly, an isolated motion direction of a pixel compared to its neighbor pixels often is a distracting motion, or noise. To remove such isolated distracting motions, after the global spatial motion smoothing filter 112 is applied to the gradients of MHI, at each interest point, a local motion field filter 114 is applied. As described herein, this local filtering operates by computing a structure proximity between any pixel in the local region and the interest point. Thus, the motion at a pixel is enhanced or weakened based on its structure proximity with the interest point. Additional details of filtering are described below.

With reference to the feature descriptors 120, in one implementation the spatial features 122 are modeled by Histograms of Oriented Gradient (HOG) in the intensity image. Other features may be alternatively used, e.g., the well known SIFT or STIP features. To characterize the temporal features 124, in one implementation a temporal feature descriptor is provided as described herein, referred to as Histograms of Oriented Gradient in Motion History Image (HOG-MHI). The feature vectors (descriptors 120), which contain both the HOG sub-vector (spatial features 122) or other features and the HOG-MHI sub-vector (temporal features 124), may be modeled by a Gaussian Mixture Model (GMM) based-classifier 130 for recognition of actions 132.

The hierarchical filtered motion field technique is thus based on Motion Gradient Image (MGI). The MGI comprises the intensity gradients of MHI, which directly yield the motion orientation; (note that the magnitudes of the MHI gradients are not meaningful). Although high-level information may be needed to distinguish the action motions from the background motions, noisy motions may be reduced, and the action motions enhanced by hierarchical filtered motion field for action motion enhancement. This is generally because an isolated motion direction of a pixel compared to its neighbor pixels is often a distracting motion or a noisy motion, and at each interest point, the motion regions which are closer to the interest point contribute more to the object to which the interest point belongs.

Figure 2:
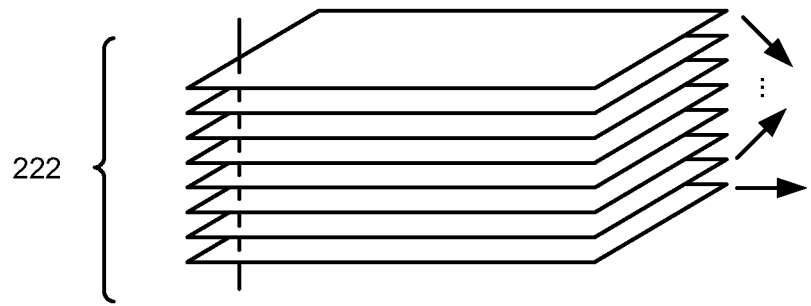
FIG. 2 is a representation of binary images of the smoothed gradients quantized into one of eight bins based on direction.
Figure 3:
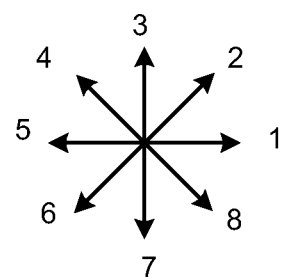
FIG. 3 is a representation of direction quantization for maintaining motion information including direction information in a HOG-MHI component of a feature descriptor.

In global filtering, a motion smoothing step is applied at the MGI to remove the isolated motion directions by morphological operations to obtain a global filtered motion field comprising smoothed gradients of MHI that remove the isolated distracting motions. To prepare for local filtered motion field processing, the smoothed gradients of MHI are decomposed as a number of layers with different motion directions. FIG. 2 illustrates an 8-bin-layer representation 222 of a binary image of the smoothed gradients of MHI; the arrows show the direction corresponding to each bin, as also represented in FIG. 3. As shown in FIG. 3, a total 8 bin HOG-MHI motion directions are used in one implementation, falling in the range of n±22.5° (n=1, 2, ... 8).

With respect to the local filtered motion field, at each interest point, the local filtered motion field is applied by computing structure proximity between the pixels in the local region and the interest point on each bin-layer of the smoothed gradients of MHI. In general, the local region comprises the window for calculating HOG-MHI. A connect component operation is performed to obtain motion blobs (sets of points/pixels).

Figure 5:
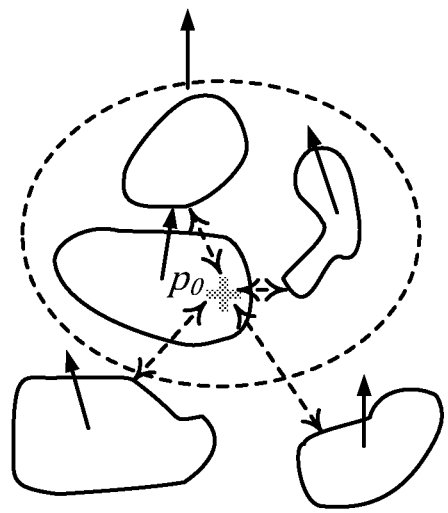
FIGS. 5 and 6 comprise representations of sets (blobs) of pixels with associated motion data that is enhanced or reduced by local motion filtering based upon proximity of the pixel sets to an interest point.

FIG. 5 illustrates the blobs of bin-layer 3, in which the motion blobs with shorter distances to the interest point in the local region are more likely to represent the motion of the object to which the interest point $p_0$ belongs. Thus the motions at these blobs (the blobs inside the dashed ellipse) may be enhanced. Conversely, the blobs with longer distances to the interest point most likely belong to other objects (blobs outside the dashed ellipse), and thus the motions at those blobs may be weakened.

Let $p_0$ denote the interest point, and let B denote a blob. Denote $d(p_0 B)$ to be the minimum distance between $p_0$ and all the points in B, that is, $$d(p_0, B) = \min_{p \in B} d(p_0, p).$$

Note that instead of a minimum, another distance value may be used to represent proximity of the set to the interest point, e.g., center of mass of the blob, an average distance of some number of sampled pixels, and so on.

Denote $(W_x, W_y)$ to be the size of the window containing the blobs. Then the maximum distance between $p_0$ and any point in the window is $\sqrt{W_x^2 + W_y^2}/2$. For any pixel $p \in B$, its structure proximity to interest point $p_0$ is defined as:

$$s(p) = 1 - \frac{2d(p_0, B)}{\sqrt{W_x^2 + W_y^2}} \quad (2)$$

Note that s(p) is a value between zero (0) and one (1). If a pixel does not belong to any blobs, its structure proximity is defined to be 0.

Figure 6:
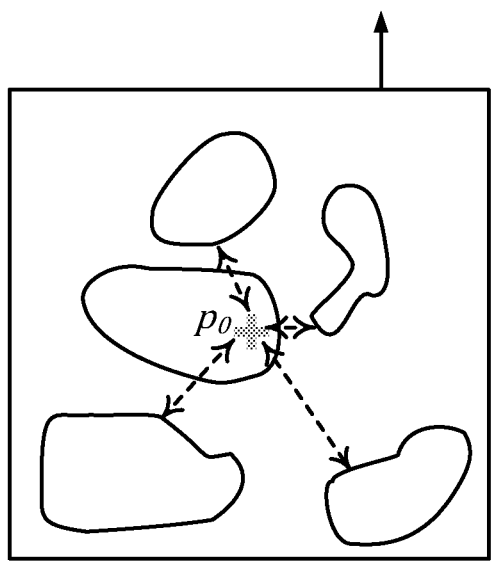

FIG. 6 shows a plot of the structure proximity map where the shorter the arrow to a blob, the larger the structure proximity values. The structure proximity values are used to normalize motion histograms in the HOG-MHI calculation.

The local appearance and motion features are characterized by grids of Histograms of Oriented Gradient (HOG) in the neighborhood with a window size ($W_x$, $W_y$) at each interest point in the intensity image and MHI respectively. The window is further subdivided into a ($n_x$, $n_y$) grid of patches (e.g., a 3 by 3 grid). Normalized histograms of the patches are concatenated into HOG (for appearance features in the intensity image) and HOG-MHI (for motion features in the MHI) descriptor vectors as the input of the classifier for action recognition.

Figure 4:
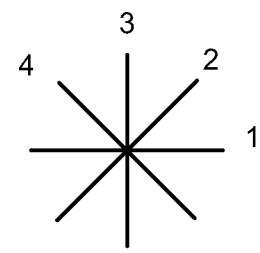
FIG. 4 is a representation of quantization for maintaining spatial information in HOG component of a feature descriptor.

As shown in FIGS. 3 and 4, the calculations of HOG and HOG-MHI are different. HOG is computed without considering the directions to make it more robust to appearance changes; although FIG. 4 shows four bins for HOG quantization, other implementations may have a different number of bins, such as three bins. However, for HOG-MHI computation, because directions are important to describe motion features, the performance of action recognition is increased by considering directions, and thus in one implementation, eight directional bins are provided for HOG-MHI quantization.

To handle scale variations, instead of performing a multi-scale process at each interest point, randomly selected window sizes (e.g., between 24 and 48) may be used. The size of each window is calculated by $W_x = kn_x$ and $W_y = kn_y$, where k is randomly chosen to make sure the values of $W_x$, $W_y$ are between $W_{min}$ (minimum window size) and $W_{max}$ (maximum window size), which in one implementation is $W_{min}=24$ and $W_{max}=48$. Using randomly selected window sizes handles scale variations well and achieves improved results relative to using fixed set of scales. To normalize the histograms of MGI, the structure proximity values are used instead of the magnitudes at each patch (as magnitudes are not meaningful in this context).

To characterize the complex nature of rich descriptors, a Gaussian Mixture Model (GMM) 130 is used, which is known to have the ability to model any given probability distribution function when the number of mixture components is large. Given a K component GMM, the probability of a patch x is $$Pr(x \mid \Omega) = \sum_{k=1}^{K} w_k N(x; \mu_k, \Sigma_k) \quad (3)$$

where $N(x, \mu_k, \Sigma_k)$ denotes the normal distribution with mean $\mu_k$ and variance $\Sigma_k$. The mixture weight $w_k$ satisfies the constraint $\Sigma_{k=1}^{K} w_k = 1$. The set of parameters of GMM model is denoted as:

$$\Omega, \Omega = \{w_k, \mu_k, \Sigma_k\}, 1 \le k \le K.$$

Although the general mode in equation (3) supports full covariance matrices, in practice a diagonal covariance matrix is sufficient for most tasks. Furthermore, diagonal matrix GMMs are more computational efficient and robust compared with full matrix GMM. The advantages of using a GMM are that it is computationally inexpensive, and it is based on a well-understood statistical model. GMM, allows clearly estimating the probability that each patch belongs to the background or to the action of interest, which can be used to distinguish patches of actions of different categories and the background.

Consider C categories of actions with the parameter of $\Omega^1$, $\Omega^2, \ldots, \Omega^C$. Each category corresponds to a GMM with K components $\Omega^C = \{w_k^C, \mu_k^C, \Sigma_k^C\}$. The parameters can be estimated using maximum likelihood estimation. For example, for the cth category, the process collects the patches $X^c$ associated with an action c, and then estimates $\Omega^c$ via the maximum estimation of:

$$\max_{\Omega^c} L^c = \max_{\Omega^c} \sum_{x_i \in X^c} \log Pr(x_i \mid \Omega^c)$$

A straightforward way to train these models is to train $\Omega^1$, $\Omega^2, \ldots, \Omega^C$ separately, however it is more effective to obtain $\Omega^1, \Omega^2, \ldots, \Omega^C$ coherently by the use of a universal background model. An action-independent background model $\Omega^0$ is first trained based on the patch features $x \in X^{all}$. Then $\Omega^1$, $\Omega^2, \ldots, \Omega^C$ are adapted from $\Omega^0$ by changing $\{\mu_k^c\}$ as:

$$p_{ik}^c = \frac{w_k N(x_i; \mu_k^0, \Sigma_k^0)}{\sum_{k'=1}^{K} w_{k'} N(x_i; \mu_{k'}^0, \Sigma_{k'}^0)} \text{ for } x_i \in X^c \quad (4)$$

$$\mu_k^c = \frac{1}{n^c} \sum_{x_i \in X^c} p_{ik}^c x_i$$

Note that it is feasible to update $w_k^c$, and $\Sigma_k^c$, as well, however, they may remain the same as the background model. Compared with the approach which trains action model separately, the use of a background model is more computational efficient and leads to a good alignment of different action models over different components, which makes the recognition more accurate.

After obtaining the GMM parameters $\Omega^1, \Omega^2, \ldots, \Omega^C$, an unknown video clip may be classified according to the action category. If V denotes the collection of patch descriptors in a video clip, the action may be estimated by:

$$c^* = \underset{c}{\operatorname{argmax}} \sum_{x \in V} \log Pr(x \mid \Omega^c) \quad (5)$$

Exemplary Operating Environment

Figure 7:
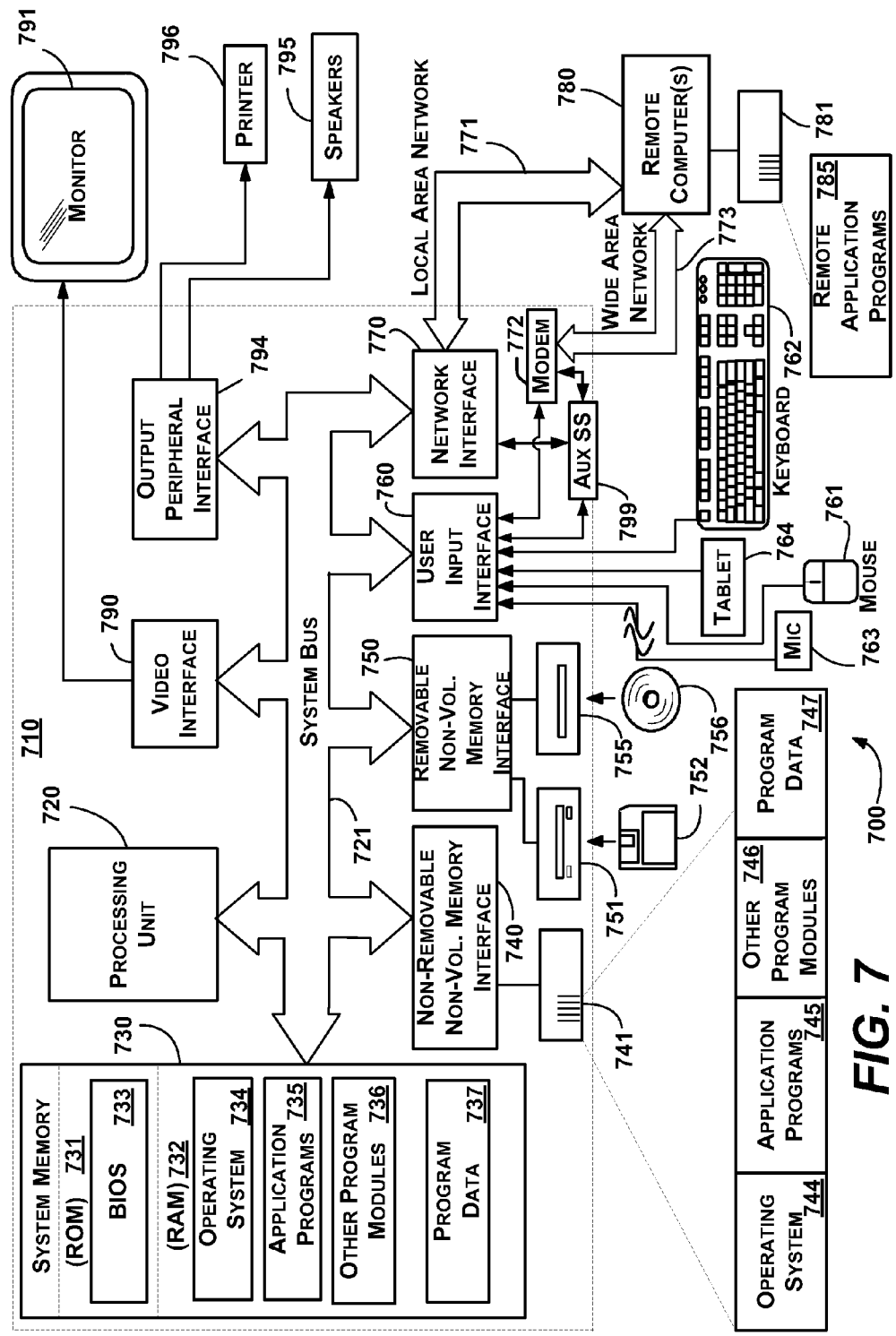
FIG. 7 shows an illustrative example of a computing environment into which various aspects of the present invention may be incorporated.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising at least one processor, and an interest point detection component configured to detect possible points of interest in video data, wherein the possible points of interest correspond to action motions in the video data, a hierarchical motion filter configured to process the possible points of interest into a set of interest points corresponding to motion in video data, wherein the hierarchical motion filter comprises a global filtering and a local filtering component, from which feature descriptors representing regions corresponding to those interest points are generated, each feature descriptor including a spatial component and a temporal component, wherein the spatial component is first obtained separately from the temporal component, wherein the spatial component and the temporal component are subsequently combined to detect possible points of interest, wherein the spatial component and the temporal component detect the possible points of interest in the video data with a most recent motion association with the possible points of interest, and wherein the hierarchical motion filter distinguishes the action motions from background motions in the video data.

2. The system of claim 1 wherein the interest point detection component comprises a corner detector that detects the possible points of interest and a component that represents each possible point of interest as an intensity corresponding to any recent motion associated with that point.

3. The system of claim 2 wherein the hierarchical motion filter includes a local motion filter that for the each interest point varies motion data of one or more sets of neighboring pixels based upon proximity to the each interest point, and wherein the local motion filter varies the motion data by enhancing or reducing a set of pixels from one or more sets of neighboring pixels based upon the proximity to the each interest point.

4. The system of claim 3 wherein the proximity to the each interest point is determined by one pixel within a set of pixels that has a minimum distance to the each interest point.

5. The system of claim 1 wherein the hierarchical motion filter includes a global filter that processes gradients of a motion history image to filter out the possible points of interest based on whether each point of interest in the gradients has an associated intensity above a threshold.

6. The system of claim 1 wherein the each feature descriptor includes a spatial component, wherein the spatial component represents a set of appearances of the regions corresponding to the each feature descriptor and a temporal component.

7. The system of claim 1 wherein the each feature descriptor includes a histogram of gradient-motion history image component that represents temporal information, including associated direction information.

8. The system of claim 1 further comprising, an action classifier modeled from the feature descriptors.

9. The system of claim 8 wherein the action classifier comprises a Gaussian Mixture Model.

10. In a computing environment, a method performed on at least one processor, comprising:
    distinguishing action motions from background motions in video data;
    detecting possible points of interest in video data, wherein the possible points of interest correspond to action motions in the video data;
    processing the possible points of interest into a set of interest points corresponding to motion in video data, wherein a hierarchical motion filter is used to process the possible points of interest and to distinguish the action motions from the background motions in the video data; and
    generating feature descriptors representing regions corresponding to those interest points, wherein each feature descriptor including a spatial component and a temporal component, wherein the spatial component is first obtained separately from the temporal component, wherein the spatial component and the temporal component are subsequently combined to detect possible points of interest, and wherein the spatial component and the temporal component detect the possible points of interest in the video data with a most recent motion association with the possible points of interest.

11. One or more computer-readable storage memory device having computer-executable instructions, which when executed perform steps, comprising;
    distinguishing action motions from background motions in video data;
    detecting possible points of interest in video data, wherein the possible points of interest correspond to action motions in the video data;

processing the possible points of interest into a set of interest points corresponding to motion in video data, wherein a hierarchical motion filter is used to process the possible points of interest and to distinguish the action motions from the background motions in the video data; and generating feature descriptors representing regions corresponding to those interest points, wherein each feature descriptor including a spatial component and a temporal component, wherein the spatial component is first obtained separately from the temporal component, and wherein the spatial component and the temporal component are subsequently combined to detect possible points of interest, wherein the spatial component and the temporal component detect the possible points of interest in the video data with a most recent motion association with the possible points of interest.

* * * * *